United States Patent
Guest et al.

(10) Patent No.: US 8,944,401 B2
(45) Date of Patent: Feb. 3, 2015

(54) VIBRATION DAMPER OF A VEHICLE AND METHOD OF REDUCING VIBRATION

(75) Inventors: Philip Guest, Warwick (GB); Joseph Joyce, Kenilworth (GB); James Hawkins, Kingsbridge (GB); Peter Hawkins, Kingsbridge (GB); Dave Hird, Knightcote (GB)

(73) Assignee: Jaguar Land Rover Limited, Whitley, Coventry (GB)

( * ) Notice: Subject to any disclaimer, the term of this patent is extended or adjusted under 35 U.S.C. 154(b) by 0 days.

(21) Appl. No.: 13/275,791

(22) Filed: Oct. 18, 2011

(65) Prior Publication Data

US 2012/0267505 A1 Oct. 25, 2012

(30) Foreign Application Priority Data

Oct. 19, 2010 (GB) .................................. 1017630.3
Oct. 19, 2010 (GB) .................................. 1017631.1

(51) Int. Cl.
*F16M 13/00* (2006.01)

(52) U.S. Cl.
USPC .......................................... 248/560; 248/500

(58) Field of Classification Search
USPC .................................. 248/500, 560; 180/68.5
See application file for complete search history.

(56) References Cited

U.S. PATENT DOCUMENTS

| | | | |
|---|---|---|---|
| 5,643,693 A | 7/1997 | Hill et al. | |
| 6,305,357 B1 * | 10/2001 | Soukeras | 123/495 |
| 6,648,090 B2 * | 11/2003 | Iwase | 180/68.5 |
| 7,051,461 B2 | 5/2006 | Itou | |
| 7,614,469 B2 * | 11/2009 | Kumar et al. | 180/68.5 |
| 2005/0186092 A1 | 8/2005 | Lee et al. | |
| 2005/0224683 A1 | 10/2005 | Hirayu | |
| 2007/0114083 A1 | 5/2007 | Asao et al. | |
| 2008/0059012 A1 | 3/2008 | Konopa et al. | |

FOREIGN PATENT DOCUMENTS

| | | |
|---|---|---|
| CN | 101783460 | 7/2010 |
| CN | 102454746 A | 5/2012 |
| EP | 2444690 A2 | 4/2012 |
| GB | 2484681 A | 4/2012 |
| GB | 2484682 A | 4/2012 |
| JP | 59011920 | 1/1984 |
| JP | 2001069673 | 3/2001 |
| JP | 2005068743 | 3/2005 |
| JP | 2006252960 | 9/2006 |

OTHER PUBLICATIONS

UK Search Report for GB1017631.1, dated May 26, 2011, 2 pages.
UK Search Report for GB1017630.3, dated May 12, 2011, 2 pages.

* cited by examiner

*Primary Examiner* — Amy J Sterling
(74) *Attorney, Agent, or Firm* — Reising Ethington P.C.

(57) ABSTRACT

In a vehicle an auxiliary machine (13) such as an air compressor is physically associated with the vehicle battery (12). The battery provides for substantial additional mass which resists transmission of noise and vibration from the small machine to the vehicle structure (11). The small machine (13) may itself form part of a battery clamp arrangement.

7 Claims, 2 Drawing Sheets

VIBRATION DAMPER OF A VEHICLE AND METHOD OF REDUCING VIBRATION

This invention relates to a vibration damper of a motor vehicle, and particularly to a vibration damper for a small or auxiliary machine of such a vehicle.

BACKGROUND OF THE INVENTION

Conventionally a motor vehicle has an internal combustion engine, and a battery for starting the engine and powering electrical equipment of the vehicle. The vehicle may also be provided with one or more small auxiliary machines associated with the vehicle and separately mounted on the vehicle structure. Such machines typically operate intermittently on demand, or are otherwise not directly associated with normal operation of the vehicle engine.

Examples of auxiliary machines are electrically driven compressors/pumps (e.g. for air conditioning and air suspension systems), and brake modulators. These machines, whilst being small compared with the vehicle engine, can impart significant noise and vibration through the vehicle structure, which cannot sufficiently be attenuated in a cost-effective manner.

As a partial solution, the small machine(s) may be mounted resiliently in order to insulate the vehicle structure, and/or may be mounted to a very stiff portion of the vehicle structure so that the structure resists transmission of noise and vibration. These solutions are not particularly effective, and the latter can require additional material to strengthen a mounting region.

A combined battery for a vehicle is heavy, in the range 15-30 kg, and must be located about the vehicle in an accessible position. Typically the battery is placed in the under-bonnet area to ensure both easy access and short electrical connections to equipment with a high current demand.

The mounting location of the battery must be strong to support the weight of the battery, and if adjacent the front of the vehicle may necessitate additional reinforcement of the vehicle structure. A suitable battery clamp is required to firmly attach the battery to the vehicle, typically a fabricated steel component having screw attachments.

An object of this invention is to reduce such noise and vibration towards the point where it is no longer apparent to an occupant of the vehicle.

BRIEF SUMMARY OF THE INVENTION

According to a first aspect of the present invention there is provided in combination a vehicle battery and a mounting for a small machine of a vehicle, the combination further including a resilient support for attachment to a vehicle structure.

The invention provides for the mass of the vehicle battery, typically greater than 15 kg, to be associated with the small machine (typically 2-5 kg) so as to substantially increase the effective mass thereof, the combined mass being supported by the resilient means thereby to reduce the level of noise and vibration transmitted to the vehicle structure.

Preferably the mass ratio of small machine and battery is greater than 1:3, and preferably greater than 1:5.

The vehicle battery acts both to increase the effective mass which must be excited by the vibration source, and may also act as a damper for vibrations by virtue of the somewhat resilient nature thereof, and the fluid constituents in the form of a liquid or a gel.

In one embodiment, the battery and small machine are attached to a tray, and said resilient support bears upon the tray, and the small machine and battery may be rigidly attached to said tray. The small machine may be resiliently supported on said tray. Further, the small machine and battery may be side by side.

In another embodiment the mounting for the small machine is substantially rigid with the battery, may be integrated with the battery, and in particular forms part of the casing of the battery. The mounting may comprise the battery casing. In this embodiment the small machine may be mounted in use directly to the mounting, or indirectly via a resilient isolator. The isolator typically comprises a spring or springs of any suitable form, and may further incorporate damping.

In one embodiment the small machine overlies the battery and in another embodiment the small machine and battery are side by side.

In another embodiment the mounting for the small machine is mounted to the battery via a resilient isolator. In this embodiment a support or tray of the battery may for example also comprise a support for a resilient mounting of the small machine. Such an arrangement permits first and second resilient isolators, namely that between the battery and the mounting of the small machine, and between the combination and the vehicle structure.

In a second aspect of the invention the combination further includes one or more small machines mounted on the mounting. A particular feature of the invention is that it allows the inevitable large mass of the battery to be used for the secondary purpose of reducing the level of noise and vibration from a small machine.

According to a third aspect of the invention there is provided a rigid support for a battery of a vehicle, the support being adapted to permit mounting of a small machine thereon, and having a resilient support for attachment to a vehicle structure. Such a rigid support may be in the form of a battery tray, and the resilient support may be any suitable kind of spring/damper system.

In a preferred embodiment of the invention the auxiliary machine forms part or all of the battery retaining clamp.

In this embodiment, by virtue of forming the battery clamp, the noise and vibration of the small machine must pass via the battery to the vehicle structure. Accordingly, as explained above, the battery can itself act as an isolator and/or damper of noise and vibration.

In one embodiment the small machine is mounted on top of the battery and is part of the clamping arrangement which secures the battery to an undertray or the like. The small machine may comprise a top frame having screw-threaded fasteners for connection to the supporting structure beneath the battery.

It will be appreciated that effective reduction of transmission of noise and vibration permits additional mounting possibilities for the small machine in the vehicle under bonnet region, in particular the combination of battery and small machine may be mounted in a less stiff structural area which, but for the invention, would otherwise have been deemed unsuitable, or which would have required stiffening by addition of material. Accordingly the invention offers the possibility of weight and cost savings, as well as packaging advantages.

The invention also provides a method of isolating vibration transmitted from a small machine through the structure of a vehicle having a battery, the method comprising the steps of physically associating the small machine with the battery via a common mounting structure, and attaching the common mounting structure to the vehicle through a resilient isolator.

The invention may further comprise a method of reducing noise and vibration from an electrically powered auxiliary machine of a vehicle having a battery, the method comprising the steps of physically associating the small machine and battery and resiliently mounting the resulting combination to the vehicle.

According to a fourth aspect of the present invention there is provided a battery clamp for the vehicle battery of the first aspect of the invention, the clamp comprising a mounting for the small machine of the first aspect of the invention.

According to a fifth aspect of the present invention there is provided a battery clamp for the battery of a vehicle, the clamp comprising a mounting for an auxiliary machine of the vehicle. The mounting for the auxiliary machine may comprise all or part of the battery clamp.

In one embodiment said mounting and auxiliary machine are integrated. In another embodiment said mounting and auxiliary machine are inseparable.

In a sixth aspect of the invention the combination further includes one or more auxiliary machines mounted on or integrated with the mounting. A particular feature of the invention is that it allows the inevitable large mass of the battery to be used for the secondary purpose of reducing the level of noise and vibration from an auxiliary machine.

Such an arrangement has the advantage that a single battery mounting area of the vehicle can be made strong enough to accept both the battery and the auxiliary machine. A typically auxiliary machine has a mass in the range 2-5 kg, which is relatively small in relation to the battery. The combined mass of battery and auxiliary machine may for example be accommodated on the vehicle battery mounting with little or no additional reinforcement.

Preferably the mass ratio of auxiliary machine and battery is greater than 1:3, and preferable greater than 1:5.

Furthermore at least part of the mass and cost of a conventional battery clamp is saved, in addition to the saving which is a consequence of not having to reinforce that part of the mounting structure which would otherwise support the auxiliary machine.

The invention provides for the mass of the vehicle battery, typically greater than 15 kg, to be associated with the auxiliary machine, the combined mass being preferably supported by resilient means, thereby to reduce the level of noise and vibration transmitted to the vehicle structure from the auxiliary machine.

The vehicle battery acts to increase the effective mass which must be excited by the vibration source, and may also act as a damper for vibrations by virtue of the somewhat resilient nature thereof, and the fluid constituents in the form of a liquid or a gel.

In one embodiment a mounting for the auxiliary machine is substantially rigid with the battery, may be integrated with the battery, and in particular forms part of the casing of the battery. The mounting may comprise the battery casing. In this embodiment the auxiliary machine may be mounted in use directly to the mounting, or indirectly via a resilient isolator. The isolator typically comprises a spring or springs of any suitable form, and may further incorporate damping and/or a restrictor to obviate excessive relative travel of the auxiliary machine and mounting.

The invention also provides a method of clamping a battery to a vehicle, and comprising the steps of placing an auxiliary machine against the battery, and attaching the auxiliary machine to the vehicle so as to sandwich the battery therebetween.

In one embodiment, the further includes the step of placing the auxiliary machine on the battery.

A preferred embodiment of the invention comprises a vehicle, a battery and an electrically powered auxiliary machine, wherein the auxiliary machine comprises the battery retaining clamp.

In this embodiment, by virtue of forming the auxiliary machine as a battery clamp, the noise and vibration of the small machine must pass via the battery to the vehicle structure. Accordingly, as explained above, the battery can itself act as an isolator and/or damper of noise and vibration.

In one embodiment the auxiliary machine is mounted on top of the battery and is part of the clamping arrangement which secures the battery to an undertray or the like. The auxiliary machine may comprise a top frame having screw-threaded fasteners for connection to the supporting structure beneath the battery. The top frame may locate on the battery in a predetermined manner, for example by engagement of form-fitting features so as to be relatively immovable other than in the direction of attachment.

In a further aspect of the present invention, there is provided a method of clamping a battery into a vehicle, and comprising the steps of placing an auxiliary machine against the battery, and attaching the auxiliary machine to the vehicle so as to sandwich the battery therebetween.

It will be appreciated that effective reduction of transmission of noise and vibration permits also additional mounting possibilities for the auxiliary machine in the vehicle under bonnet region, in particular the combination of battery and auxiliary machine may be mounted in a less stiff structural area which, but for the invention, would otherwise have been deemed unsuitable because of transmission of noise and vibration from the auxiliary machine. Accordingly the invention offers the possibility of weight and cost savings, as well as packaging advantages.

BRIEF DESCRIPTION OF THE SEVERAL VIEWS OF THE DRAWING

Several embodiment of the invention are now described by reference to the accompanying drawings in which.

DETAILED DESCRIPTION OF THE INVENTION

In the accompanying drawings, the dimensions are illustrative and should not be taken as representative of any particular installation. Furthermore certain dimensions are exaggerated in order to better explain the invention.

Figure 4:
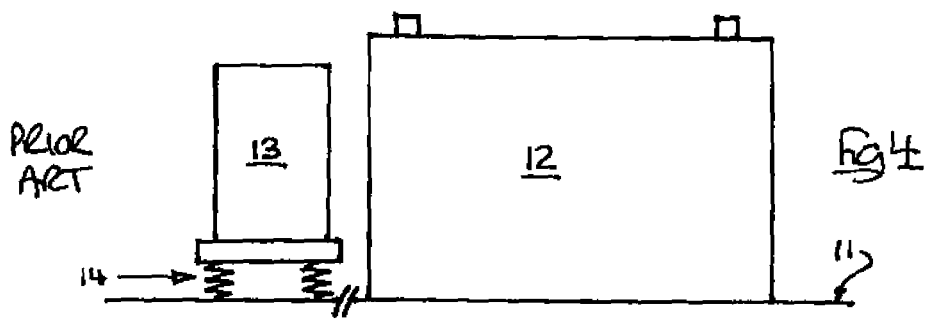
FIG. 4 illustrates a prior art mounting.

FIG. 4 illustrates a typical prior arrangement of a vehicle in which the vehicle structure (11), typically the body shell, supports a battery (12) and a small machine (13). The battery and small machine are not adjacent, but positioned according to packaging and maintenance requirements—in practice they may be quite distant.

The battery is heavy, in the range 15-30 kg for an internal combustion engined vehicle, and is securely mounted via a clamp arrangement (not shown). In a hybrid or range extended vehicle, the battery may be larger than a conventional lead/acid battery, and heavier.

The small machine (13) is typically a compressor, pump, modulator or the like, and may be fixed rigidly or resiliently. Where possible a resilient mounting (14) using or consisting of rubber is often used to minimize transmission of noise and vibration to the vehicle structure.

Figure 1:
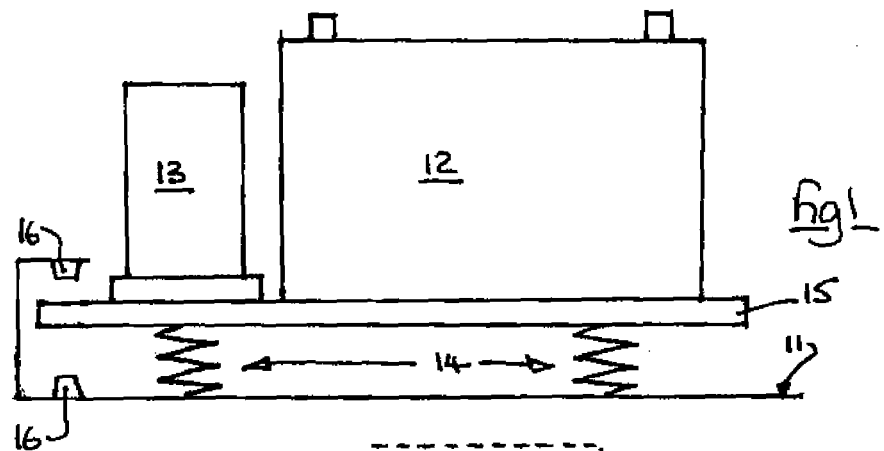
FIG. 1 illustrates in schematic elevation a first embodiment of the invention.

FIG. 1 illustrates a first embodiment in which the small machine (13) is physically associated with the battery (12) via common mounting tray (15) to which both are rigidly attached by means not shown.

The tray (15) in turn is resiliently supported on the vehicle structure (11). This construction requires the small machine to excite the combined mass in order to generate significant noise and vibration, and in any event provides for tuneable resilient mounting which can be selected for the required frequency range and amplitude.

Typically the resilient mounting is selected to ensure that during highway driving movement of the tray (15) with respect to the structure (11) is within limits imposed by resilient snubbers (16) The snubbers however ensure that excessive travel of the tray (15) is prevented if the vehicle travels over rough terrain.

In a typical example a H8 battery has a mass of about 26 kg, and an air suspension pump has a mass of 4.5 kg. The resilient support (14) consists of four elastomeric mountings operating in shear and having a design rate of about 30 N/mm. Total free travel between the snubbers is around 3-4 mm.

Figure 2:
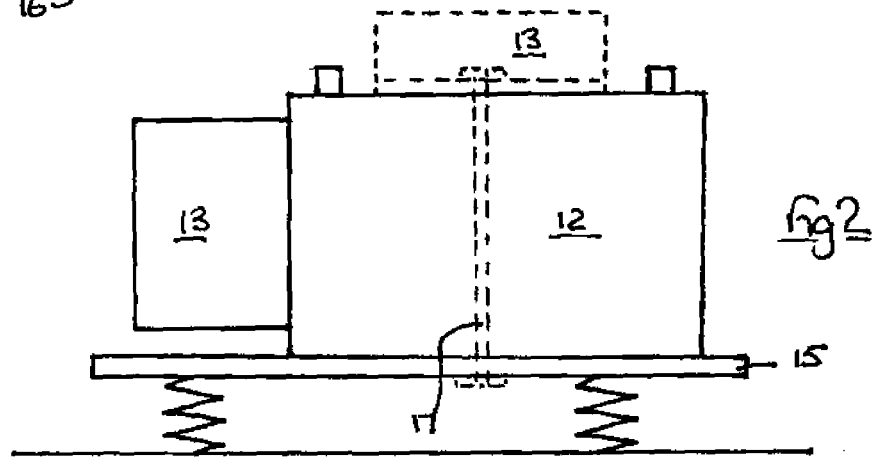
FIG. 2 illustrates in schematic elevation a second embodiment of the invention.

FIG. 2 illustrates an alternative embodiment in which the small machine (13) is directly attached to the battery (12), the combination being mounted upon a tray (15) of the kind illustrated in FIG. 1 (snubbers not shown). The small machine may be mounted to the side, or above (dotted outline) where it forms part of the usual battery clamp arrangement (17). This latter arrangement permits the cost and weight of the conventional battery clamp to be reduced.

Figure 3:
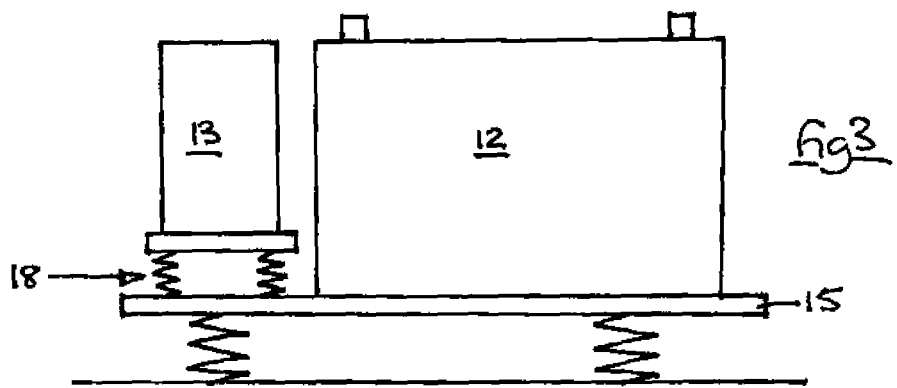
FIG. 3 illustrates in schematic elevation a third embodiment of the invention.

In the arrangement of FIG. 3, the small machine (13) or the mounting thereof is attached to the tray (or battery) via a second resilient mount (18). This arrangement provides for further damping or isolation, and for a small machine of about 4.5 kg may consist of three metal coil compression springs having 3-4 mm float between snubbers (not shown), and a rate of 5.7 N/mm.

Adjustment of spring rates and the provision of additional damping is within the ordinary skill of an appropriately educated engineer, taking into account the nuisance frequencies and the component mass(es). The invention provides an inexpensive means of substantially reducing noise and vibration, can result in material and weight savings of the vehicle structure and can also eliminate somewhat expensive treatment of noise and vibration by additional isolation and sound proofing materials.

The invention may also increase battery life by protecting the battery from vibrations transmitted to it via the vehicle structure, such as those generated by the vehicle engine and road suspension at key frequencies. The invention is particularly effective at frequencies above 20 Hz.

In the embodiments of FIGS. 1 to 3 a tray is used to physically associate the battery and small machine and the resilient support consists of four elastomeric mountings. However, it would be apparent to the skilled person that the resilient support may alternatively comprise a resilient member to physically connect the battery and small machine, the resilient member being also for attachment to the vehicle structure; or, that the resilient support may comprise a resilient member arranged to physically connect the battery and small machine, and also further comprise rigid or resilient members for attachment to a vehicle structure.

Figure 5:
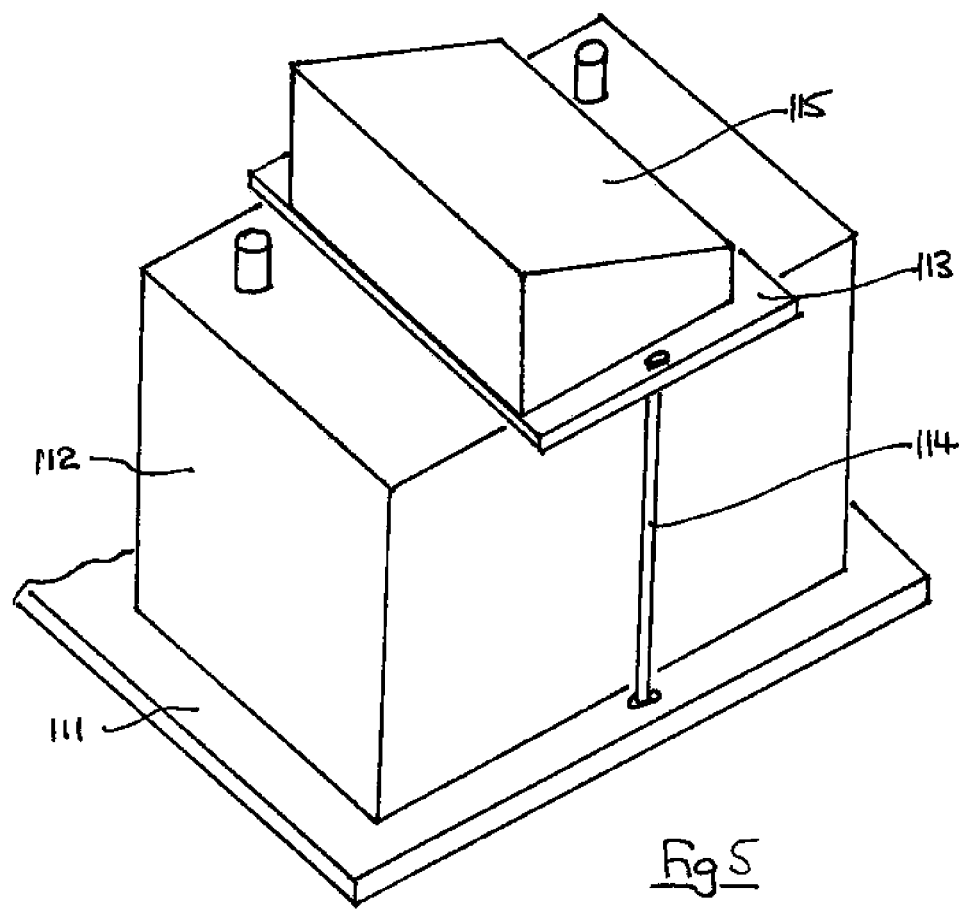
FIG. 5 illustrates in schematic elevation a fourth embodiment of the invention in which the vehicle structure 111, typically a tray of the body shell, supports a battery.

In the arrangement of FIG. 5, the auxiliary machine (113) is physically associated with the battery (112) by virtue of forming the battery clamp. This construction requires the auxiliary machine to excite the combined mass in order to generate significant noise and vibration, and accordingly the battery can provide an effective damper to transmission of such noise and vibration to the vehicle structure. The battery is heavy, in the range 15-30 kg for a conventional internal combustion engined vehicle, and is securely mounted via the clamp arrangement (113). In a hybrid or range extended vehicle, the battery may be larger than a conventional lead/acid battery, and heavier.

A resilient mounting of the auxiliary machine (115) on the clamp (113) may be selected to ensure that during highway driving movement of the machine (115) with respect to the clamp (113) is within limits imposed by snubbers (not shown) The snubbers however ensure that excessive travel of the machine (115) is prevented if the vehicle travels over rough terrain.

In a typical example a H8 battery has a mass of about 26 kg, and an air suspension pump has a mass of 4.5 kg. A resilient support between the pump mounting and battery may consist of four elastomeric mountings operating in shear and having a design rate of about 30 N/mm. Total free travel between the snubbers would be around 3-4 mm.

Adjustment of spring rates and the provision of additional damping is within the ordinary skill of an appropriately educated engineer, taking into account the nuisance frequencies and the component mass(es). The invention provides an inexpensive means of substantially reducing noise and vibration, can result in material and weight savings of the vehicle structure and can also eliminate somewhat expensive treatment of noise and vibration by additional isolation and sound proofing materials.

In the case of a hybrid vehicle, when running in electric motor mode, the mass of the battery can very substantially reduce transmission of noise and vibration to the passenger cell.

It will be appreciated that the auxiliary machine can take any suitable form and shape. For example a pancake shape may be better suited to utilize almost the entire upper surface of the battery whilst minimizing the additional height of the assembly. The proportions of the battery may change in order to accommodate the additional height of the auxiliary machine.

The mounting (113) of the auxiliary machine is typically fully integrated so that, for example, the body or casing of the machine is the mounting. In this arrangement, the mounting as such, may not be separately identifiable, but is an additional function of the casing.

In the case of a hybrid vehicle, when running in electric motor mode, the mass of the battery can very substantially reduce transmission of noise and vibration to the passenger cell.

The invention claimed is:

1. In physical combination, a vehicle battery and small auxiliary machine that when operated generates vibration, the combination comprising a resilient support for attachment to a vehicle structure, the battery and the small auxiliary machine being arranged such that the battery is a damper to the vibration generated by the small auxiliary machine, and the resilient support being arranged to reduce the vibration transmitted to the vehicle structure from the combination of the battery and the small auxiliary machine, wherein the vehicle structure comprises a body shell of the vehicle, and the small auxiliary machine comprises one of an electrically-driven compressor, an electrically-driven pump, or a brake modulator.

2. The combination of claim 1, wherein the small machine and battery are in physical contact.

3. The combination of claim 1, wherein the small machine comprises a battery clamp.

4. The combination of claim 1, wherein the small machine overlies the battery.

5. The combination of claim 1, wherein the small machine is an electrically powered pump.

6. A vehicle comprising a combination of a vehicle battery and a small auxiliary machine that when operated generates vibration, the combination comprising a resilient support for attachment to a structure of the vehicle, the battery and the small auxiliary machine being arranged such that the battery is a damper to the vibration generated by the small auxiliary machine, and the resilient support being arranged to reduce the vibration transmitted to the vehicle structure from the combination of the battery and the small auxiliary machine, wherein the small auxiliary machine comprises one of an electrically-driven compressor, an electrically-driven pump, or a brake modulator.

7. A vehicle according to claim 6, wherein the vehicle structure comprises a body shell of the vehicle, and further wherein the combination of the battery and small auxiliary machine is directly attached to the body shell via said resilient support.

* * * * *